(12) United States Patent
Kydd

(10) Patent No.: US 12,071,020 B2
(45) Date of Patent: Aug. 27, 2024

(54) ELECTRIC VEHICLE SERVICE EQUIPMENT ADAPTER MODULE TO CONTROL ADDED LOADS

(71) Applicant: NetZero V2G Technologies LLC, Fort Washington, PA (US)

(72) Inventor: Paul Harriman Kydd, Lawrenceville, NJ (US)

(73) Assignee: NETZERO V2G TECHNOLOGIES LLC, Fort Washington, PA (US)

( * ) Notice: Subject to any disclaimer, the term of this patent is extended or adjusted under 35 U.S.C. 154(b) by 0 days.

(21) Appl. No.: 16/580,663

(22) Filed: Sep. 24, 2019

(65) Prior Publication Data
US 2021/0086619 A1    Mar. 25, 2021

(51) Int. Cl.
| | |
|---|---|
| *B60L 1/00* | (2006.01) |
| *B60L 53/62* | (2019.01) |
| *B60L 53/64* | (2019.01) |
| *B60L 53/68* | (2019.01) |

(52) U.S. Cl.
CPC .............. *B60L 1/003* (2013.01); *B60L 53/62* (2019.02); *B60L 53/64* (2019.02); *B60L 53/68* (2019.02)

(58) Field of Classification Search
CPC .......... B60L 1/003; B60L 53/68; B60L 53/64; B60L 53/62; Y02T 90/12; Y02T 90/16; Y02T 90/167; Y02T 10/7072; Y02T 10/70; Y04S 30/14
See application file for complete search history.

(56) References Cited

U.S. PATENT DOCUMENTS

| | | | |
|---|---|---|---|
| 6,847,937 B1 | 1/2005 | Savage et al. | |
| 7,582,979 B2 | 9/2009 | Oyobe et al. | |
| 8,227,937 B2 | 7/2012 | Barlock et al. | |
| 8,278,881 B2 | 10/2012 | Woody et al. | |
| 8,463,449 B2 | 6/2013 | Sanders | |
| 8,509,976 B2 | 8/2013 | Kempton | |
| 8,575,780 B2 | 11/2013 | Moon | |
| 8,599,587 B2 | 12/2013 | Chapman et al. | |
| 8,716,891 B2 | 5/2014 | Choi | |
| 8,768,533 B2* | 7/2014 | Ichikawa .................. | H02J 7/00 701/1 |
| 8,772,961 B2* | 7/2014 | Ichikawa ................ | B60L 53/18 307/9.1 |
| 8,957,547 B2 | 2/2015 | Chang et al. | |
| 9,263,895 B2 | 2/2016 | Naiknaware et al. | |
| 9,276,410 B2 | 3/2016 | Binder et al. | |
| 9,293,948 B2 | 3/2016 | Freitas et al. | |

(Continued)

OTHER PUBLICATIONS

File History for U.S. Appl. No. 16/563,108.
(Continued)

*Primary Examiner* — Nha T Nguyen
(74) *Attorney, Agent, or Firm* — Bergman LLC; Michael Bergman

(57) ABSTRACT

This invention enables Electric Vehicle Service Equipments to control external electrical loads, such as water heaters. The parallel electric energy demand of the external load augments the remotely controllable energy demand for charging the vehicle creating a larger controllable demand than for charging the vehicle only. This larger demand is useful in responding to requests for ancillary service from the grid and can increase the revenue for regulation services.

3 Claims, 2 Drawing Sheets

(56) References Cited

U.S. PATENT DOCUMENTS

| | | |
|---|---|---|
| 9,436,179 B1 | 9/2016 | Turney et al. |
| 9,481,259 B2 | 11/2016 | Choi et al. |
| 9,520,623 B2 | 12/2016 | Honma et al. |
| 9,573,478 B2* | 2/2017 | Jefferies .................. B60L 53/66 |
| 9,577,291 B2* | 2/2017 | Kolavennu ........... H01M 10/42 |
| 9,584,047 B2 | 2/2017 | Frohman et al. |
| 9,705,333 B2 | 7/2017 | Clifton |
| 9,754,300 B2 | 9/2017 | Kempton et al. |
| 9,758,046 B2 | 9/2017 | Harper et al. |
| 9,783,068 B2 | 10/2017 | Eger et al. |
| 9,796,258 B1 | 10/2017 | Bundschuh et al. |
| 9,821,669 B2 | 11/2017 | Tanabe |
| 9,845,021 B2 | 12/2017 | Yang et al. |
| 9,852,481 B1 | 12/2017 | Turney et al. |
| 9,862,287 B2 | 1/2018 | Tang et al. |
| 9,948,101 B2 | 4/2018 | Chow |
| 9,987,941 B2 | 6/2018 | Miftakhov et al. |
| 10,007,259 B2 | 6/2018 | Turney et al. |
| 10,126,796 B2 | 11/2018 | Dorn et al. |
| 10,137,796 B2 | 11/2018 | Huang et al. |
| 10,140,670 B2 | 11/2018 | Gow |
| 10,166,877 B2 | 1/2019 | Zeng et al. |
| 10,166,882 B2 | 1/2019 | Yang et al. |
| 10,173,543 B2 | 1/2019 | Yang et al. |
| 10,186,865 B2 | 1/2019 | Chiang et al. |
| 10,333,306 B2 | 6/2019 | Hooshmand et al. |
| 10,333,307 B2 | 6/2019 | Hooshmand et al. |
| 10,873,210 B2* | 12/2020 | Lowenthal ............ H02J 7/0027 |
| 10,913,370 B2* | 2/2021 | Kubota ................. H02J 7/0025 |
| 11,264,843 B1 | 3/2022 | Lim et al. |
| 2003/0205936 A1 | 11/2003 | Beckerman et al. |
| 2008/0111424 A1 | 5/2008 | Yeh |
| 2009/0179495 A1 | 7/2009 | Yeh |
| 2010/0019577 A1 | 1/2010 | Barlock et al. |
| 2011/0133693 A1* | 6/2011 | Lowenthal .............. B60L 53/30 |
| | | 320/109 |
| 2011/0202192 A1 | 8/2011 | Kempton |
| 2011/0202217 A1 | 8/2011 | Kempton |
| 2011/0202401 A1 | 8/2011 | Kempton et al. |
| 2011/0202418 A1* | 8/2011 | Kempton .................. H02J 3/32 |
| | | 705/26.1 |
| 2011/0245987 A1* | 10/2011 | Pratt ........................ B60L 53/16 |
| | | 700/295 |
| 2012/0032636 A1* | 2/2012 | Bianco .................... B60L 53/22 |
| | | 320/109 |
| 2012/0106672 A1* | 5/2012 | Shelton ................... B60L 53/31 |
| | | 375/295 |
| 2012/0223675 A1* | 9/2012 | Bianco ...................... H02J 3/14 |
| | | 320/109 |
| 2012/0267952 A1 | 10/2012 | Ballatine et al. |
| 2013/0020873 A1 | 1/2013 | Barlock et al. |
| 2013/0080254 A1 | 3/2013 | Thramann |
| 2013/0124005 A1* | 5/2013 | Ichikawa ................ B60L 53/51 |
| | | 701/1 |
| 2013/0141040 A1* | 6/2013 | DeBoer ..................... H02J 7/02 |
| | | 320/109 |
| 2013/0313243 A1* | 11/2013 | Gonze ...................... F01N 9/00 |
| | | 219/205 |
| 2014/0062401 A1 | 3/2014 | Gadh et al. |
| 2014/0067140 A1 | 3/2014 | Gow |
| 2015/0015213 A1* | 1/2015 | Brooks ................... B60L 53/18 |
| | | 320/137 |
| 2015/0097527 A1 | 4/2015 | DeDona et al. |
| 2015/0326012 A1 | 11/2015 | Tsuchiya |
| 2016/0006245 A1 | 1/2016 | Chow |
| 2016/0137082 A1* | 5/2016 | Jefferies .................. B60L 53/66 |
| | | 320/109 |
| 2016/0137087 A1* | 5/2016 | Haas ....................... B60L 53/63 |
| | | 320/109 |
| 2016/0137149 A1 | 5/2016 | Kamachi et al. |
| 2016/0207409 A1* | 7/2016 | Ueo ........................ B60L 53/14 |
| 2016/0211676 A1 | 7/2016 | Chiang et al. |
| 2017/0129356 A1 | 5/2017 | Johnson |
| 2018/0018007 A1 | 1/2018 | Dorn et al. |
| 2018/0037121 A1 | 2/2018 | Narla |
| 2018/0090935 A1 | 3/2018 | Asghari et al. |
| 2018/0105052 A1* | 4/2018 | Patil ........................ B60L 53/31 |
| 2018/0244170 A1* | 8/2018 | Kydd ....................... H02J 3/322 |
| 2019/0036341 A1 | 1/2019 | Asghari et al. |
| 2019/0056451 A1 | 2/2019 | Asghari et al. |
| 2019/0079473 A1 | 3/2019 | Kumar et al. |
| 2019/0131923 A1 | 5/2019 | Hooshmand et al. |
| 2019/0137956 A1 | 5/2019 | Hooshmand et al. |
| 2019/0140465 A1 | 5/2019 | Hooshmand et al. |
| 2019/0147552 A1 | 5/2019 | Nakayama et al. |
| 2019/0148945 A1 | 5/2019 | Nakayama et al. |
| 2019/0206000 A1 | 7/2019 | ElBsat et al. |
| 2019/0322178 A1* | 10/2019 | Sturza ..................... B60L 58/10 |
| 2019/0369166 A1 | 12/2019 | Moslemi et al. |
| 2020/0031238 A1* | 1/2020 | Kydd ....................... H02J 3/383 |
| 2020/0067400 A1* | 2/2020 | Li .............................. H02P 3/22 |

OTHER PUBLICATIONS

File History for U.S. Appl. No. 17/248,576.
File History for U.S. Appl. No. 17/330,662.
File History for U.S. Appl. No. 17/333,236.
Beck, Leonard J.; V2G: a text about vehicle-to-grid, the technology which enables a future of clean and efficient electric-powered transportation; 2009—Trzy updated Jul. 2, 2009, Leonard Beck, c2009, Newark, Del., USA.
SAE International; SAE Electric Vehicle and Plug in Hybrid Electric Vehicle Conductive Charge Coupler; J1772 Oct. 2012; Issued Oct. 1996; Revised Oct. 2012.
Kristian, Maggie; Great Plains Institute; Pilot Project Gets Solar Panels in Sync with Electric Vehicle Chargers; Jan. 9, 2020; https://betterenergy.org/blog/solar-synchronization-electric-vehicle-chargers/.
Trabish, Herman; Utility Dive; Utilities in hot water: Reqalizing the benefits of grid-integrated water heaters; Jun. 20, 2017; https://www.utilitydive.com/news/utilities-in-hot-water-realizing-the-benefits-of-grid-integrated-water-hea/445241/.
Open vs. Closed Charging Stations: Advantages and Disadvantages; Open Charge Alliance; Aug. 8, 2018; https://www.openchargealliance.org/uploads/files/OCA-Open-Standards-White-Paper-compressed.pdf.
File History for U.S. Appl. No. 14/101,423.
File History for U.S. Appl. No. 15/441,484.
File History for U.S. Appl. No. 16/055,972.
File History for U.S. Appl. No. 16/562,565.

* cited by examiner

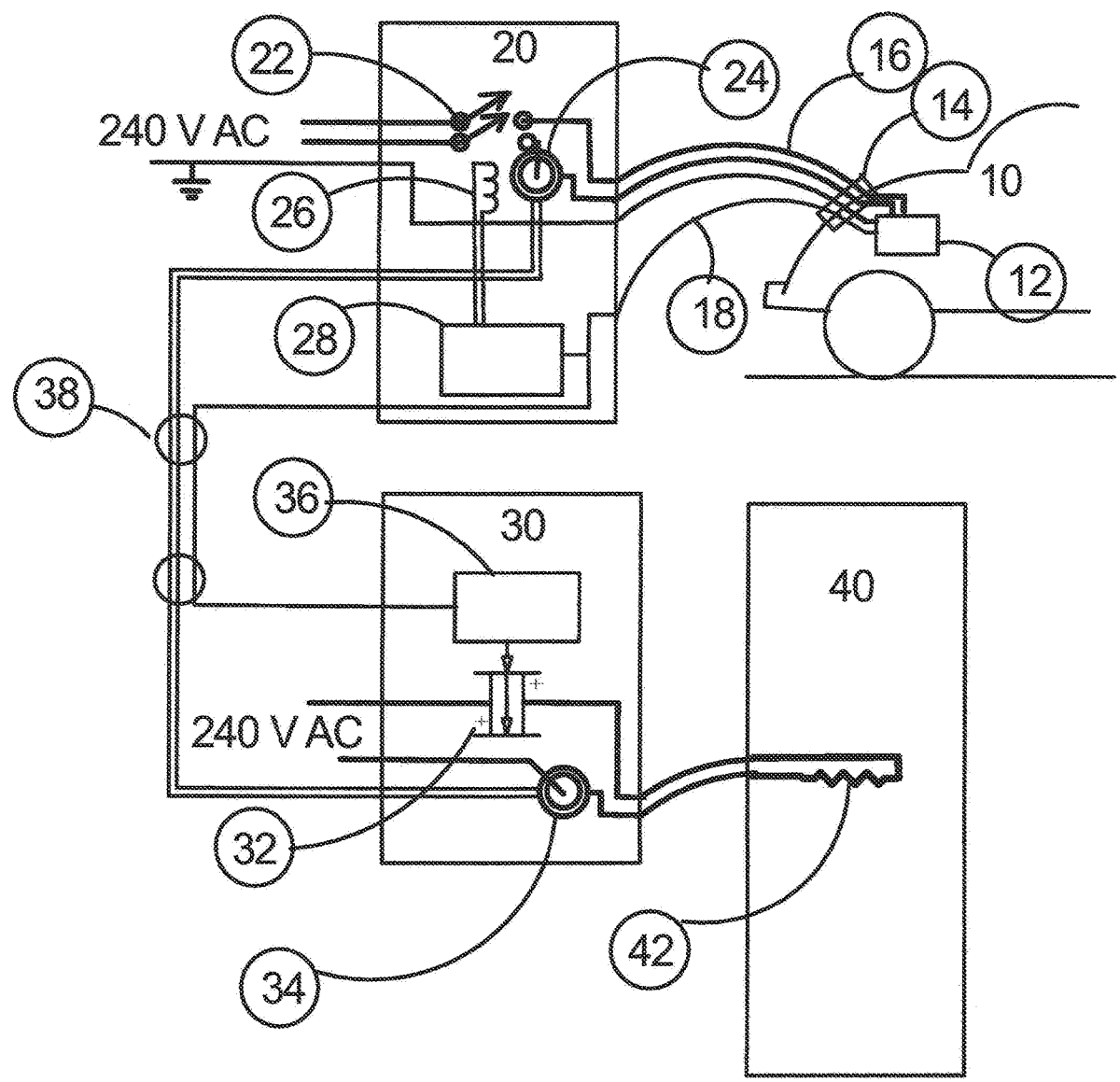

ELECTRIC VEHICLE SERVICE EQUIPMENT ADAPTER MODULE TO CONTROL ADDED LOADS

CROSS-REFERENCE TO RELATED APPLICATIONS

This application claims the benefit of U.S. Provisional Patent Application 62/860,043, entitled "Electric Vehicle Service Equipment Adapter Module to Control Added Loads", filed Jun. 11, 2019.

This application is related to U.S. Patent Application "Vehicle-Solar-Grid Integration" Ser. No. 14/101,423 filed Dec. 10, 2013, now issued as U.S. Pat. No. 9,566,867, Feb. 14, 2017, by the present inventor, and Provisional Patent Applications "Bidirectional Power Electronic Interface" No. 61/889,067, filed Oct. 10, 2013, "Bidirectional Power Electronic Interface with Sustaining Power" 61/921,583, filed Dec. 30, 2013, "Vehicle-Solar-Grid Integration with Supplementary Battery" 62/050,819, filed Sep. 16, 2014, "Low-Cost EVPV for Vehicle-Solar-Grid Integration" 62/297,462, filed Feb. 19, 2016, "Minimum Cost EVPV for Vehicle-Solar-Grid Integration" 62/299,756, filed Feb. 25, 2016, later filed as non provisional patent application Ser. No. 15/441,484, Feb. 24, 2017, and Ser. No. 16/562,565, Sep. 3, 2019, "Vehicle-Solar-Grid Integration for Back up Power" 62/465,424 filed Mar. 1, 2017 now filed as non provisional patent application Ser. No. 16/044,683, Application "Non Grid-Tied Vehicle-Solar Uninterruptable Power System" 62/544,041, filed Aug. 11, 2017, now filed as patent application Ser. No. 16/055,035, and "Demand Charge Management by Electric Vehicles", 62/721,216, filed Aug. 22, 2018, and now filed as non provisional patent application Ser. No. 16/563,108 by the present inventor and "Multiple Load Micro-Grid Implementation of Vehicle-Solar-Grid Integration" 62/320,701, filed Apr. 11, 2016, by the present inventor and Brian R. Hamilton of Cranbury, NJ, and Chris A. Martin of Media, PA.

FEDERALLY SPONSORED RESEARCH

None

CITED LITERATURE

"SAE J-1772 Standard for Electric Vehicle Charging Equipment", Revised October, 2012.

"PJM Load Response Activity Report", April, 2018, FIG. 11, p 11, PJM. Com.

"Utilities in Hot Water: Realizing the Benefits of Grid-Integrated Water Heaters", Herman Trabish, Utility Dive, Jun. 20, 2017.

U.S. Pat. No. 9,754,300, Sep. 5, 2017 and U.S. Pat. No. 8,509,976, Aug. 13, 2013, Kempton, "Electric Vehicle Station Equipment for Grid-Integrated Vehicles", assigned to The University of Delaware.

U.S. Pat. No. 9,987,941 Jun. 5, 2018, Miftakhov, "Systems and Methods for Local Autonomous Response to Gird Conditions by Electric Vehicle Charging Stations".

U.S. Pat. No. 10,173,543, Jan. 8, 2019, Yang et al, "Charging System for Electric Vehicle and Method for Controlling Charging of Electric Vehicle" assigned to BYD automotive. Also U.S. Pat. No. 10,166,882, Jan. 1, 2019, Yang et al
U.S. Pat. No. 10,166,877 Jan. 1, 2019, Zeng et al
U.S. Pat. No. 9,862,287 Jan. 9, 2018, Tang et al
U.S. Pat. No. 9,845,021 Dec. 19, 2017, Yang et al assigned to BYD U.S. Pat. No. 9,796,258, Oct. 24, 2017, "Packet Switching Converter Between Engine, Motor, Battery and Grid", Bundscher, assigned to Ideal Power.

U.S. Pat. No. 10,137,796, Nov. 27, 2018, Huang et al "Control System for Electric Vehicle Charging Station and Method Thereof", assigned to ABB.

U.S. Pat. No. 9,758,046, Sep. 12, 2017, Harper et al, "Plug-In Electric Vehicle (PEV) Smart Charging Module", assigned to University of Chicago, Argonne, LLC.

FIELD OF THE INVENTION

The present disclosure relates to electric vehicle charging, and more particularly to electric vehicle charging that is controlled to minimize demands on the electric grid and to provide ancillary services to the grid. The invention permits additional household loads to be controlled from a single Electric Vehicle Service Equipment (EVSE) to increase the controlled demand, and therefore the revenue from the ancillary service provided.

BACKGROUND OF THE INVENTION

Electric Vehicles (EVs) with their very large storage batteries ranging in capacity from 16 to over 60 kiloWatt hours (kWh) can be aggregated to provide a major controllable load to the electric utility industry. Uncontrolled, this load can be a major problem. If every EV plugs in and begins to recharge at 5 PM, it can aggravate the peak load on the entire electric grid system from generation through transmission to distribution resulting in high-cost energy and increased investment by the utilities. Because it doesn't matter when the EV is charged, as long as it is ready to go the next day, it is possible to allow the EV driver to plug in at 5 PM but delay the actual charging until the early morning hours when electric energy is available and inexpensive, and when excess transmission and distribution capacity are available.

Managed charging is enabled by the communication functions of the Internet and the wireless telephone infrastructure underlying the "Internet of Things". Individual devices can be aggregated and controlled from a central point providing data handling and reporting functions via the Internet "cloud". The devices in this case are EVSEs which link the electric power available from the grid, typically as 240 V, single phase Alternating Current (AC) in residences, to the on board charger on the EV via a flexible cable and plug. The design and operating details of the EVSE and plug are specified in SAE Standard J-1772.

This managed charging aggregation can provide a number of services to the grid. When the EVSE is drawing energy, the current can be modulated to provide regulation service to the grid. Since the grid must provide energy that exactly matches the total load from second to second to maintain system frequency and voltage, there is a need for generation or load that can adjust to deliver or take energy on demand. Battery systems are ideal for this service because they can respond instantaneously. Bidirectional systems in which the EV can both take and deliver energy maximize this capability, but even a monodirectional charger can be modulated around a mid point in its power capability to provide regulation service.

The drawback in monodirectional regulation is that the demand of the EV for recharging at any time is limited, and the amount of regulation service that can be performed is likewise limited. Regulation service is compensated on the basis of MegaWatts (MW) of regulation offered times the hours during which it is offered. A typical rate is $200,000 per MW year, equivalent to $200 per kiloWatt (kW) year, or $0.0228 per kW hour. A typical EV will require 2500 kWh of recharging per year to travel 10,000 miles. Since regulation has to be offered around a midpoint, the total regulation service that can be offered is 1250 kWh, which is worth $28.52 per year. This is hardly enough to be worth the trouble. Consequently there is an incentive to increase the controlled load to increase the potential revenue. Enabling that increased load economically is the objective of this invention.

Hot water heating offers a ready alternative, which can supplement EV charging as a controllable load. Hot water heating already constitutes 80% of the 2017 PJM Demand Response Regulation Registration Load Reduction Methods, as referenced above. This is done by providing a remote controlled switch on the water heater that can be turned on at times of low electric energy demand and turned off at times of high demand or during Demand Response "Events". The article "Utilities in Hot Water" cited above describes the $3.6 Billion opportunity for integrating the 45% of all US water heaters that are electric with the needs of the grid. Water heaters share the characteristic of EV charging that the time of power draw can be delayed and the amount of power can be modulated without impacting the functionality of the device. For homes with a linked and controlled EV, the grid integrating control signal is available in the EVSE. What is needed is an apparatus and method to incorporate the water heater load into the EVSE control. That is the invention described herein.

BRIEF SUMMARY OF THE INVENTION

The objective of this invention is achieved by tapping into the EVSE to obtain the signal designating the power level to be supplied to the on-board EV charger in response to grid requests, and using this signal to control the power supplied to the hot water heater. Data on the power actually fed to the hot water heater is then added to the power fed to the on-board charger of the EV for transmission back to the Regional Transmission Operator or Independent System Operator (RTO/ISO) to confirm performance in response to requests for ancillary service.

The objective is accomplished in a separate module, which contains power-regulating means similar to those in the EVSE. The signal from the EVSE is sent to the module over a low voltage signal line running from the EVSE to the hot water heater. The resulting power measurement is fed back through separate conductors in the signal line to the EVSE where it is combined with the power measurement to the EV charger. The signal line may be replaced with a wireless connection between the EVSE and the separate module located at the hot water heater. The module is the apparatus of this disclosure.

This invention is particularly applicable to energy accumulating loads heating or cooling large thermal masses such as water heaters, hot tubs and pool heaters in residences. Various industrial-heating/cooling loads can also be controlled in this way.

BRIEF DESCRIPTION OF THE DRAWINGS

FIG. 2 is a schematic diagram of a proportional control version of the invention in which the Pulse Width Modulated (PWM) signal from the control pin 18 of EVSE 20 is used to modulate the input to water heater 40.

DETAILED DESCRIPTION OF THE INVENTION: THE PREFERRED EMBODIMENT

Figure 1:
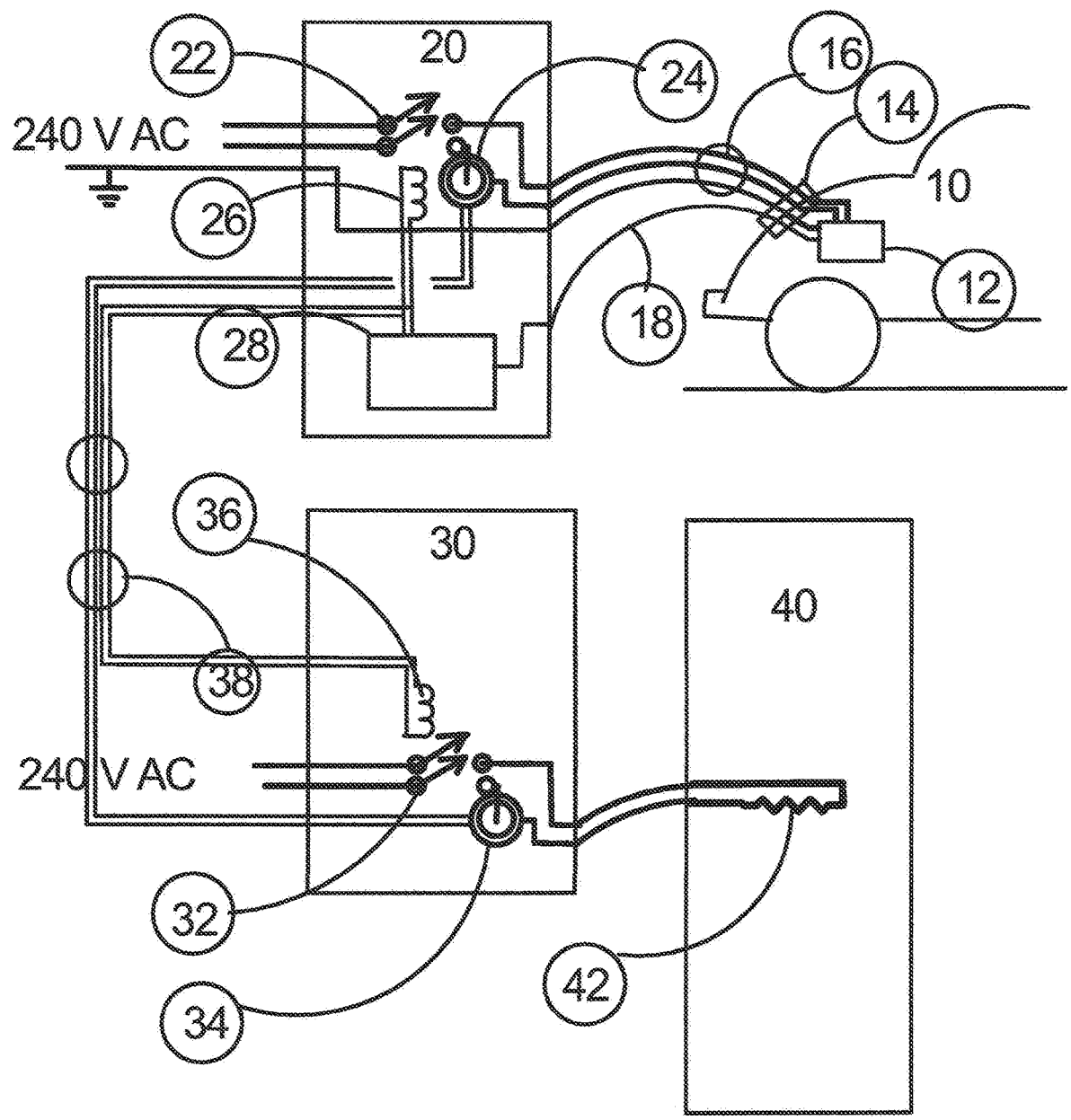
FIG. 1 is a schematic diagram of an on-off switched version of the invention shown as module 30 which modulates the power delivered to water heater 40 through switch 32 in proportion to power delivered to electric vehicle 10 by EVSE 20 through switch 22, and adds a measurement of the power delivered to the water heater 40 by current transformer 34 in module 30 to the power delivered to electric vehicle 10 as measured in EVSE 20 by current transformer 24.

FIG. 1 shows an electric vehicle 10 with on-board battery charger 12 plugged in to EVSE 20 via J-1772 connector 14. Connector 14 contains power wiring 16 and control pin wire 18. EVSE 20 contains power relay 22 in the AC circuit, which is operated by coil 26, as directed by J-1772 control circuit 28. The power delivered to vehicle 10 by EVSE 20 is measured by current transformer 24 on one leg of the AC circuit. EVSE 20 can be controlled remotely by an aggregator to constitute a "smart" load, which can respond to requests for demand management and grid regulation by modulating the amount of power delivered to the vehicle and reporting the results. EVSE 20 can also be controlled locally by a timer or by a networked Time Of Use (TOU) function to accomplish demand charge minimization by shifting the load to off-peak hours.

To accomplish the objective of this invention the signal from control circuit 28 to coil 26 is transmitted through signal line 38 to module 30, which contains power switch 32 operated by coil 36 in parallel with coil 26 and current transformer 34, which is compatible with current transformer 24 in EVSE 20. Signals from EVSE 20 to turn on charging to EV 10 will also turn on the power to heating element 42 in water heater 40 via relay 32 in module 30, and the measurement of the energy delivered to water heater 40 by current transformer 34 will be added to the measured energy delivered to EV 10 and transmitted for billing and other purposes.

In FIG. 2 Circuit 28 generates a Pulse Width Modulated (PWM) square wave that is used to inform the on-board charger of EV 10 how much current it is allowed to draw. Per the J-1772 standard, October, 2012, p 14, 15 the current limit ranges from 6 Amps at 8% Pulse Width to 45 amps at 85% Pulse Width. It extends to 80 A at 96% Pulse Width. In this invention the same signal is sent via line 38 to controller 36 in module 30 where it is used to control preferably a solid state switch 32 to provide power input to the water heater element 42 proportional to the PWM signal.

This PWM signal can be controlled remotely over the internet or a cell phone connection to perform proportional modulation of the on board charger and of other loads as disclosed in this invention. When transmitted to the on-board charger 12 the charger will draw only that amount of power permitted by the current limitation at 240 V. When transmitted through signal line 38 to module 30 the module will supply electric energy to another load only in proportion to the same limitation.

The solid state switch 32 is shown as a pair of MOSFETs, but could preferably be a pair of insulated Gate Bipolar Transistors (IGBTS). Three phase circuits can be controlled equally well with an array of 6 MOSFETs or IGBTS. Signal line 38 can be replaced by a wireless connection to simplify installation.

EXAMPLE

A residence is equipped with an EVSE, for example the ENEL-X JuiceBox with a capability of delivering up to 40 Amps, 9.6 kW, from a single phase 240 V line to an Electric Vehicle, for example a Nissan Leaf. The Leaf is able to recharge at 6.7 kW, with a total capacity, fully charged, of 42 kWh. The residence is also equipped with an electric hot water heater, for example one with a capacity of 120 gallons and a heating element drawing 8 kW, or better, two standard electric water heaters, each with a capacity of 80 gallons and an element drawing 4 kW. The daily use of hot water is 100 gallons consuming 18 kWh. If both the EVSE and the hot water heater(s) are uncontrolled and on at the same time in the early evening, they will draw a total of 14.7 kW at a time of peak demand and maximum cost.

By applying this invention, even though the EV is plugged in at 5 PM and the hot water heater is calling for power, neither load can operate until the EVSE is enabled, either by a local timer or remotely by TOU or aggregator when electric energy is in ample supply and prices are low, say at midnight. Once enabled, both loads draw power from the 240 V source. If ancillary services are being provided, the electric power being supplied to both loads is modulated in line with the second to second needs of the grid, and the average power delivered is half the maximum rate. When energy begins to be in higher demand, say at 6 AM, the system is turned off, but by this time both the EV and the water heater are ready for another day of use.

If the EV is half charged when plugged in to a modulated EVSE, it will draw 3.3 kW, and over the six hours of charging it will accumulate 19.8 kWh (80 miles of range), bringing it very nearly to full charge. If not modulated it could accumulate very nearly a full charge (150 miles) in the six off-peak hours. If the EV reaches full charge, on-board charger 12 will shut off the charging current with the J-1772 plug still connected. If additional energy is needed for the EV or for hot water, an override switch can be used to add it at full power after 6 AM, but at higher cost.

The water heater will take 8 kW, unmodulated, and reach maximum temperature in 2 hours, 15 minutes for 100 gallons. When the water is hot, the thermostat in heater 42 will shut off the power to the hot water heater. At 4 kW, modulated, it will take four and a half hours to provide the required 100 gallons. Note that when the system is enabled, both loads operate independently of one another. The EV will charge as much as it can, even if the water heater is off, and the water will be heated, even if the EV is fully charged or not connected.

Relevant Previous Literature

U.S. Pat. No. 9,754,300, Kempton, is the latest of a sizeable literature by the University of Delaware group on Vehicle-to-Grid technology. It is focused solely on the vehicle, not on additional loads as in this invention, and is inherently unsuited to this application because the load would need a complex and expensive analog to the Electric Vehicle Equipment required to be installed in the EV by their system.

U.S. Pat. No. 9,987,941, Mifitakhov, extends ancillary grid service to an autonomous system that senses grid demands and responds by modulating EV Charging load, but makes no mention of additional loads. This invention could function to amplify the returns from Miftakhov's invention U.S. Pat. No. 10,173,543, Yang, and a number of others assigned to BYD in China disclose the use of a Pulse Width Modulated signal to control charging of an electric vehicle but make no mention of the use of the same signal to control another load, which is the essence of this invention.

U.S. Pat. No. 9,796,258, Bundscher, discloses the use of packet switching which is Ideal Power's primary technology to receive electric energy from an off board engine and bidirectionally exchange energy with a battery, a motor and the grid, but not to supply other loads by mimicking the operation of the EVSE as this invention does.

U.S. Pat. No. 10,137,796, Huang, discloses a central controller for ancillary services to the grid controlling local controllers each controlling a plurality of EVSEs, but not further linked to other loads as in this invention.

U.S. Pat. No. 9,758,046, Harper, discloses a plug-in module for an electric vehicle charger, which is the closest analog to the present invention, but the structure and the purpose are different. Harper is providing a module that fits between Plug 14 and Vehicle 10 in FIGS. 1 and 2. Its purpose is to turn a dumb EVSE into a smart EVSE by including circuitry that can stop, start, increase and decrease the charging rate in response to external commands or the needs of the EV. It can also communicate the results to a remote controller. The electronics can emulate the PWM square wave for proportional control of the EV charging rate. The basic difference between Harper and the present invention, aside from the fact that Harper is not interested in accessory load control, is that Harper is providing intelligence to a dumb EVSE, and the present invention is taking the intelligence from a smart EVSE to drive a dumb accessory switch.

While the drawings and descriptions in this application are intended to be comprehensive, it will be understood by those skilled in the art that there are similar means to achieve the same ends, which fall within the claimed scope of this invention.

I claim:

1. The method of:
    installing an adapter module apparatus including:
        a switch,
        an electric device to operate the switch,
        a connection to provide electric power through the switch to a load,
        a device to measure the electric power passing through the switch to the load,
        a connection to transmit control signals from an Electrical Vehicle Service Equipment (EVSE) to the electric device to operate the switch, said connection being electrically connected in parallel to a further electrical device to operate a further switch, said further electrical device and said further switch being disposed within said EVSE, said further switch being adapted to provide electric power to an electric vehicle; and
        a connection to transmit measurements of electric power delivered to the load back to the EVSE;
    the method including installing said apparatus in close proximity to a load to control the supply of electric power to the load,
    connecting the apparatus through control wiring to an EVSE which is used to supply recharging power to an Electric Vehicle (EV),
    transmitting a control signal from the EVSE to the apparatus through said control wiring which causes the apparatus to control the amount of electric power supplied to the load in proportion to the power supplied to the EV, and generating and transmitting a measurement of the power supplied to the load to the EVSE for combining with the power measurement to the EV, wherein said load is an electrically resistive residential load chosen from the group: water heaters, space heaters, hot tubs, swimming pools, pavement heaters.

2. The method of:

installing an adapter module apparatus including:
- a switch,
- an electric device to operate the switch,
- a connection to provide electric power through the switch to a load,
- a device to measure the electric power passing through the switch to the load,
- a connection to transmit control signals from an Electrical Vehicle Service Equipment (EVSE) to the electric device to operate the switch, said connection being electrically connected in parallel to a further electrical device to operate a further switch, said further electrical device and said further switch being disposed within said EVSE, said further switch being adapted to provide electric power to an electric vehicle; and
- a connection to transmit measurements of electric power delivered to the load back to the EVSE;

the method including installing said apparatus in close proximity to a load to control the supply of electric power to the load, connecting the apparatus through control wiring to an EVSE which is used to supply recharging power to an Electric Vehicle (EV), transmitting a control signal from the EVSE to the apparatus through said control wiring which causes the apparatus to control the amount of electric power supplied to the load in proportion to the power supplied to the EV, and generating and transmitting a measurement of the power supplied to the load to the EVSE for combining with the power measurement to the EV, wherein said load is an electrically resistive industrial load chosen from the group: furnaces, ovens, space heaters, water heaters, fluid heaters, process heaters.

3. A method of increasing an electrical load controlled by an Electrical Vehicle Service Equipment (EVSE) comprising:

providing said EVSE, said EVSE including a control circuit, said EVSE including a first power relay, said first power relay including a first control input and a first switch;

providing an adapter module, said adapter module including a second power relay, said second power relay including a second control input and a second switch;

providing first supply wiring and second supply wiring;

operatively coupling an on-board charger of an EV to an electrical source through said first switch and said first supply wiring;

operatively coupling an external load to said electrical source through said second switch and said second supply wiring;

providing control wiring from said control circuit to both said first control input and said second control input so as to couple said first control input and said second control input electrically in parallel;

operating said control circuit to send a signal through said control wiring to both said first control input and said second control input so as to operate said first switch and said second switch; and supplying power from said electrical source to both said on-board charger of said EV and said external load when said signal is sent through said control wiring.

* * * * *